United States Patent Office 3,132,152
Patented May 5, 1964

3,132,152
PRODUCTION OF DITHIOFATTY ACID DERIVATIVES AND INTERMEDIATES THEREOF
Masao Ohara, Ibaraki, Kiyotsugu Yamamoto, Osaka, Takashi Kamiya, Sakai, Kunihiko Tanaka, Nara, Akira Sugihara, Osaka, and Masumi Ito, Kyoto, Japan, assignors to Fujisawa Pharmaceutical Co., Ltd., Doshomachi, Osaka, Japan, a company of Japan
No Drawing. Filed Sept. 28, 1959, Ser. No. 842,589
Claims priority, application Japan Oct. 4, 1958
6 Claims. (Cl. 260—327)

This invention relates to the production of dithiofatty acid derivatives and intermediates thereof. More particularly, this invention is concerned with novel processes of producing dithiofatty acid derivatives of the general formula

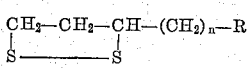

wherein R is a member selected from the group consisting of carboxyl radical and radicals capable of producing carboxyl radical by hydrolysis and $n$ is an integer of not more than 7, and intermediates thereof useful in such processes.

Compounds of the above formula are well known as vitamin-like compounds. Especially, the compound in which $n$ is 4 i.e. 6,8-dithiooctanoic acid is a valuable growth stimulating substance, which promotes metabolism in the internal organs of humans and animals.

It is therefore an object of this invention to provide novel and excellent processes of producing 6,8-dithiooctanoic acid and analogues thereof and intermediate compounds useful in such processes. It is also an object to provide novel compounds which can be converted to 6,8-dithiooctanoic acid, 6,8-dimercaptooctanoic acid, which is easily introduced by novel process to 6,8-dithiooctanoic acid in this invention, and analogues thereof. An additional object is to provide new and novel compounds of general use. Other objects and the advantages of the invention will be apparent from the following description of this invention.

According to this invention, production of compounds (VIII) is achieved by a novel sequence of reactions which shall be illustrated hereafter. ω-Halogenoformylfatty acid derivatives (I) is converted by novel processes to dithiofatty acid derivatives (VIII).

A novel sequence of reactions of this invention comprises reacting a compound (I) with acetylene in the presence of a catalyst of Friedel-Crafts reaction to produce a compound (II), treating a compound selected from the group consisting of the said compound (II), a compound (III), which is produced by reacting the said compound (II) with a compound selected from the group consisting of lower aliphatic alcohols, lower aliphatic thio-alcohols; lower fatty acids, lower thiofatty acids and the functional derivatives thereof; and aryl and aralkyl thio-alcohols in alkaline medium, and a compound (IV), which is easily produced by treating the said compound (III) with a slight amount of a compound selected from the group consisting of acids, bases, metals, and silicon compounds and which is also easily produced by treating the said compound (II) with a sulfur compound selected from the group consisting of alkali thiocyanates, alkali mono- and polysulfides and alkali thiosulfates, with hydrogen and hydrogen sulfide in the presence of a catalyst selected from the group of metal sulfides to produce a compound (V), reacting the said compound (V) with an organic sulfonyl halide in alkaline medium to produce a compound (VIII), and if needed, hydrolyzing the said compound (VIII) to produce a corresponding free acid, where the said compound (VIII) is not a free acid. These processes of this invention can be diagrammatically illustrated as follows:

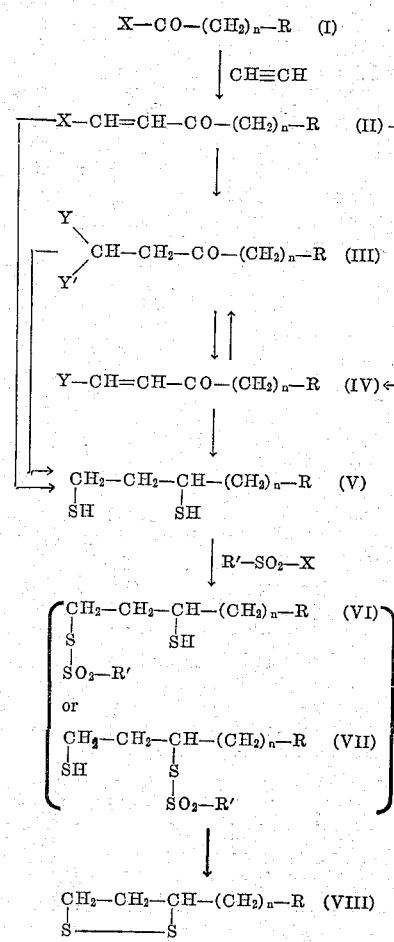

wherein X is a halogen, R is a member selected from the group consisting of carboxyl radical and radicals capable of producing carboxyl radical by hydrolysis, $n$ is an integer of not more than 7, Y and Y' are members selected from the group consisting of substituted mercapto including rhodan radical and substituted hydroxy radicals and R' is a member selected from alkyl, aryl and aralkyl radicals. Radicals capable of producing carboxyl radical by hydrolysis include esters and amides as a typical instance.

A starting material of this invention is acetylene, which is used to react with ω-halogenoformylfatty acid derivatives (I) in place of ethylene, different from the method known in the art. It can be pointed out that ethylene was hitherto essential as a starting material to react with compounds (I) to produce final compounds (VIII).

The reaction between ω-halogenoformylfatty acid derivatives (I) and acetylene in this invention is conveniently effected in the presence of a catalyst selected from those which are generally used at Friedel-Crafts reaction such as aluminum chloride, zinc chloride, cadmium chloride, ferric chloride, boron trifluoride, and so forth. It is preferred to use the solvent which dissolves a starting material (I) and does not interrupt the reaction such as chloroform, carbon tetrachloride, dichloroethane, tetrachloroethane, and so forth. It is preferred to effect the reaction at room temperature or descended temperatures.

The reaction is continued in such condition as mentioned above till absorption of acetylene is finished and the reaction mixture is poured onto ice water, extracted with organic solvent and the solvent is evaporated. The residue is distilled in vacuo yielding ω-halogenovinylketofatty acid derivatives (II) in good yield.

ω-Halogenovinylketofatty acid derivatives (II) prepared above are then converted to dimercaptofatty acid derivatives (V) directly or by way of ketofatty acid derivatives (III) or (IV), both of which are easily changed to compounds (V). The reaction, in which compounds (II) are converted to intermediate compounds (III), is conveniently effected by a method comprising reacting the said compounds (II) with lower aliphatic alcohols or thioalcohols such as methanol, ethanol, propanol, butanol, methylmercaptan, ethylmercaptan and so forth; lower fatty or thiofatty acids such as acetic acid, propionic acid, butyric acid, thioacetic acid, and so forth; or the functional derivatives of lower fatty or thiofatty acids such as anhydrides, metal salts of the said acids, and so forth; or aryl and aralkyl thioalcohols such as benzyl thioalcohol, phenyl thioalcohol, and so forth, in alkaline medium to produce the corresponding ketofatty acid derivatives (III). The said reaction is conveniently effected at room or descended temperatures. It is preferred to use an alkaline agent such as alkali metals, caustic alkalis, alkali carbonates, alkali bicarbonates and many other alkaline agents generally used, to obtain alkaline medium in this reaction. Lower aliphatic alcohols or thioalcohols, lower fatty or thiofatty acids, the functional derivatives thereof and benzyl thioalcohol etc., which react with compounds (II), also act as solvents in this reaction. Although addition of further solvent is therefore needless in the case, a solvent which does not interrupt the reaction may be added notwithstanding.

Compounds (II) may be converted by treating with a sulfur compound selected from the group consisting of alkali thiocyanates, alkali mono- and poly-sulfides and alkali thiosulfates to compounds (IV).

Compounds (IV) are also obtained almost quantitatively by the reaction which comprises heating compounds (III) with a slight amount of a compound selected from the group consisting of acids such as sulfuric acid, phosphoric acid, organic sulfonic acids, salts of organic acids, and so forth, bases such as caustic alkalis, alkali carbonates, and so forth, metals of various kinds, silicon or silica gel, and so forth, to remove Y' radicals from compounds (III).

On the other hand, compounds (IV) are easily turned back to compounds (III) by the treating with excess amount of alcohols or acids in the presence of a catalyst selected from the group consisting of such bases as alkali alcoholates and the like and such acids as hydrochloric acid and the like. The reaction is conveniently effected at room temperature in good yield.

Dimercaptofatty acid derivatives (V) are produced by reduction of compounds (II), compounds (III) or compounds (IV), all of which are produced as above in this invention. This reduction comprises treating compounds (II), compounds (III) or compounds (IV) with hydrogen and hydrogen sulfide in the presence of a catalyst selected from the group of metal sulfides in which metals are, for instance, iron, nickel, cobalt, molybdenum, and so forth, under the pressure. The catalyst described above may keep its activity in the reaction mixture which includes sulfur.

The catalyst may be prepared by many kinds of methods according to usual one known in the art. For instance, one of the usual methods comprises introducing hydrogen sulfide into a solution of metal salt or adding a solution of alkali metal to the said solution to precipitate metal sulfide and fully washing the said precipitate with water and then with the same solvent as used in the reaction. It is preferred that the catalyst thus prepared is employed in the reaction immediately after preparation. The method is also conveniently used which comprises introducing hydrogen sulfide into reduction vessel in which pulverized metal is placed, to produce metal sulfide catalyst desired in the vessel directly at the beginning of the reduction. The catalyst may be mixed with a carrier such as carbon, diatomaceous earth, alumina, magnesia, and so forth. Though proportion of the catalyst used in the reaction to the substance to be reduced is not limited, it is preferred to employ comparatively large amount of it; for instance, catalyst of 20–50% amount in weight to the substance to be reduced is conveniently used, when catalyst has no carrier.

All the inert solvents which have no effect on the reaction such as alcohols, benzene, toluene, xylene, ethers, esters, fatty acids, dioxane, and so forth, may be used. When such an acid as acetic acid, a preferable solvent, is used and the substance to be reduced is an ester of carboxylic acid, the reduced product is obtained in the form of a free acid as a result of ester exchange between the solvent used and the substance to be reduced. In that case esterification of the product is therefore necessary, if ester is desired as a product, which may be attained by the usual method well known in the art.

Hydrogen sulfide may be prepared by the reaction of sulfur with hydrogen in a reduction vessel, in which case preparation of hydrogen sulfide beforehand is not necessary. This method is conveniently preferred, because amount of hydrogen sulfide may be easily adjusted by limitation of the amount of sulfur added. Another preferable method to adjust this reaction is to place a definite amount of hydrogen sulfide into a vessel used in the reduction. Further, such sulfur compounds as producing hydrogen sulfide in the process of reaction, which are precursors of hydrogen sulfide, may be used in this reaction in place of hydrogen sulfide. As the said precursors, carbon disulfide, sulfurous acid, and so forth are included. It is desired to use hydrogen sulfide of considerable excess of theoretical amount in the reaction, and lack of hydrogen sulfide used is inclined to increase production of byproduct.

In this reaction allowable range of temperature and pressure is comparatively broad. For instance, the reaction may be achieved at below 100° C. A temperature of 100–200° C., especially about 150° C. is, however, preferred to accomplish the reaction fast. The reaction is conveniently effected at the pressure of more than 50 atmospheric pressures, especially 100–150 atmospheric pressures.

In the case of using ω-halogenovinylketofatty acid derivatives (II) as a starting material in the reaction, the reaction is conveniently achieved in the presence of corresponding amount of base because hydrogen halide is produced in the procedure of the reaction.

Dimercaptofatty acid derivatives (V) thus obtained are converted by organic sulfonyl halides in alkaline medium to dithiofatty acid derivatives (VIII) in good yield, without producing any byproduct which is inclined to result from over-oxidation, in the last reaction of this invention. In this reaction, it is reliable to produce intermediates (VI) or (VII) on the way to obtain the final substances. It is difficult, however, to know exactly which of them is mainly produced, but it is imaginable that possibility of substitution will be rather bigger in ω-position than in another. Sulfonic acid ester radical of the intermediate thus produced will be removed immediately and automatically to produce disulfide bond in molecule. In this invention, however, it will be easily understood that it is needless to separate the intermediate compound and confirm the construction thereof.

Organic sulfonyl halides used in this reaction include alkyl-, aryl- and aralkyl-sulfonyl halides such as p-toluenesulfonyl chloride, benzenesulfonyl chloride, methanesulfonyl chloride, and so forth. The solvent such as dry benzene, ethers, toluene, hexane, and so forth is conveniently preferred to use. The reaction is effected in alkaline medium which may be attained by addition of inorganic or organic bases such as solid alkali hydroxides, anhydrous alkali carbonates, pyridine, and so forth. Particularly, it is preferred to use organic bases such as pyridine, besides the said bases act as solvents as well.

If desired, the products thus obtained may be hydrolyzed to produce free carboxylic acids of the general formula

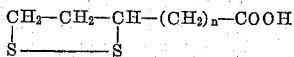

wherein $n$ is the same as described above, where the said products are not free acids.

This invention is illustrated by the following examples. It is understood, however, that the invention is not to be limited to the specific disclosure of these examples.

EXAMPLE 1

Methyl 8-Chloro-6-Oxo-7-Octenoate 10 g. of methyl 5-chloroformyl-n-valerate is dissolved in 40 ml. of carbon tetrachloride and 15 g. of aluminum chloride is added. Acetylene gas is introduced into the mixture keeping at the temperature of about 10° C. under vigorous stirring. After absorption of acetylene is finished, the viscous mixture thus obtained is poured onto a mixture of salt and ice. The layer of carbon tetrachloride is separated. The water portion remaining is extracted with carbon tetrachloride and the extracted solution is added into the solution of carbon tetrachloride separated before. The solution is washed with water and dried. The residue obtained by evaporation of the solvent is distilled in vacuo yielding 8 g. (70% of theory) of methyl 8-chloro-6-oxo-7-octanoate at B.P. 106° C./0.35 mm. Hg which immediately changes in the form of crystal. The product is recrystallized from petroleum ether to crystal of M.P. 52° C.

Analysis.—Calculated for $C_9H_{13}O_3Cl$: C, 52.79; H, 6.41. Found: C, 52.83; H, 6.53.

EXAMPLE 2

Methyl 8-Chloro-6-Oxo-7-Octenoate 170 ml. of tetrachloroethane is saturated with acetylene gas at 0° C. 98 g. of pulverized aluminum chloride is added and acetylene gas is introduced again into the solution. 54.5 g. of methyl 5-chloroformyl-n-valerate is added slowly under stirring at below 10° C. Introduction of acetylene gas is further continued under stirring at about 20° C. After absorption of acetylene is finished, the reaction mixture is poured onto a mixture of ice and saturated salt water and extracted with benzene. The benzene solution is washed with water and dried, and the solvent is evaporated. The residue is distilled in vacuo yielding 49.3 g. (79%) of methyl 8-chloro-6-oxo-7-octenoate at B.P. 130–140° C./5–6 mm. Hg which immediately crystallizes. The product is recrystallized from petroleum ether to colorless needles of M.P. 52° C.

EXAMPLE 3

Methyl 6-Chloro-4-Oxo-5-Hexenoate 24.5 g. of methyl 3-chloroformyl-n-propionate is dissolved in 80 ml. of tetrachloroethane and 48 g. of aluminum chloride is added. Acetylene gas is introduced into the mixture at about 5° C. After absorption of acetylene is finished, the reaction mixture is poured onto a mixture of salt and ice and extracted with benzene. The benzene layer is washed with water and dried, and the solvent is evaporated. The residue is distilled in vacuo yielding 18 g. (62.7%) of methyl 6-chloro-4-oxo-5-hexenoate at B.P. 109–113° C./6 mm. Hg.

Analysis.—Calculated for $C_7H_9O_3Cl$: C, 47.62; H, 5.14. Found: C, 47.72; H, 5.10.

EXAMPLE 4

Methyl 8-Dimethoxy-6-Oxooctanoate

To 23 g. of methyl 8-chloro-6-oxo-7-octenoate in 15 ml. of methanol is added drop by drop the solution of 0.54 g. of caustic soda in 10 ml. of methanol at 5–0° C. under stirring, which takes two hours. The reaction mixture is poured onto ice water, extracted with ether, washed with water and dried. The residue obtained by evaporation of ether is distilled off in vacuo yielding 2.3 g. of methyl 8-dimethoxy-6-oxooctanoate at B.P. 114–118° C./0.4 mm. Hg.

Analysis.—Calculated for $C_{11}H_{20}O_5$: C, 56.88; H, 8.68. Found: C, 56.65; H, 8.61.

EXAMPLE 5

Methyl-8-Diacetoxy-6-Oxooctanoate

A mixture of 5 g. of methyl 8-chloro-6-oxo-7-octenoate, 10 ml. of glacial acetic acid and 2.1 g. of anhydrous sodium acetate is heated on water bath of 80° C. under stirring for eight hours. The reaction mixture is poured onto ice water and extracted with ether. The ether solution is washed with water, dried and evaporated. The residue thus obtained is distilled in vacuo yielding 4.7 g. of methyl 8-diacetoxy-6-oxooctanoate at B.P. 146–151° C./0.3 mm. Hg.

Analysis.—Calculated for $C_{13}H_{20}O_7$: C, 54.16; H, 6.99. Found: C, 54.44; H, 7.06.

Acetic anhydride can be used, in the above reaction, in place of glacial acetic acid. The reaction is also achieved by additional mixture of acetic anhydride to a solution of glacial acetic acid and anhydrous sodium acetate in the above reaction.

EXAMPLE 6

Methyl 8-Dibenzylthio-6-Oxo-Octanoate and 8-Dibenzylthio-6-Oxo-Octanoic Acid The solution of sodium benzylthioalcoholate is obtained by adding the solution of 33 g. of benzylthioalcohol in 60 ml. of dry ether to 2.9 g. of metal sodium. To the solution of sodium benzylthioalcoholate is dropped the solution of 25 g. of methyl 8-chloro-6-oxo-7-octenoate in 50 ml. of dry ether at about −5° C. under stirring and continue to stir for two hours. 30 g. of dimethylformamide is added to the reaction mixture and stirred for five hours at room temperature. The reaction mixture thus obtained is poured onto ice-water and extracted with ether. The ether layer is washed with water and dried. The ether and dimethylformamide are evaporated to obtain 52.8 g. of crude methyl 8-dibenzylthio-6-oxo-octanoate.

To 3 g. of the product thus obtained is added the solution of 3 g. of 10% caustic soda in 4 ml. of ethanol, the mixture heated for one hour and the ethanol evaporated. The residue is acidified and extracted with ether. The ether layer is washed with water and dried. 8-dibenzylthio-6-oxo-octanoic acid is obtained in crystal by evaporating ether. Recrystallization from petroleum benzin-dichloroethylene produces crystals of M.P. 61–62° C.

Analysis.—Calculated for $C_{23}H_{28}O_3S_2$: C, 65.66; H, 6.51. Found: C, 65.82; H, 6.45.

S-benzylthiouronium of 8-dibenzylthio-6-oxo-octanoic acid is obtained by adding the aqueous solution of sodium salt of the said acid to a corresponding amount of the hot ethanol solution of S-benzylthiourea. The product is recrystallized from ethanol to M.P. 142–143° C.

Analysis.—Calculated for $C_{30}H_{36}O_3N_2S_3$: C, 63.37; H, 6.37; N, 4.93. Found: C, 63.11; H, 6.51; N, 5.04.

EXAMPLE 7

Methyl 6-Dimethoxy-4-Oxo-Caproate

To the solution of 17.7 g. of methyl 6-chloro-4-oxo-5-hexenate in 50 ml. of methanol is added drop by drop at 0–5° C. the solution of 6 g. of caustic soda in 150 ml. of methanol under stirring till the pH of the solution becomes 8.2 and further the stirring is continued for one hour and a half. The reaction mixture is poured onto ice water, extracted with benzene. The benzene layer is washed with water, dried and the benzene is evaporated. The residue is distilled in vacuo yielding 16.3 g. (80%) of methyl 6-dimethoxy-4-oxo-caproate at B.P. 88–92° C./0.1 mm. Hg.

EXAMPLE 8

Methyl 8-Methoxy-6-Oxo-7-Octenoate 19.5 g. of methyl 8-dimethoxy-6-oxo-octanoate is mixed with a little amount of anhydrous potassium carbonate and heated in an oil bath of 180° C. for half an hour under reduced pressure of 20 mm. Hg. The reaction mixture is distilled in vacuo yielding 16.8 g. (99%) of methyl 8-methoxy-6-oxo-7-octenoate at B.P. 145–150° C./2 mm. Hg which solidifies. The product is recrystallized from the mixture of benzene and petroleum ether to produce crystals of M.P. 55° C.

*Analysis.*—Calculated for $C_{10}H_{16}O_4$: C, 59.98; H, 8.05. Found: C, 59.94; H, 8.09.

EXAMPLE 9

Methyl 8-Methoxy-6-Oxo-7-Octenoate 4 g. of methyl 8-dimethoxy-6-oxo-octanoate is mixed with 60 mg. of potassium hydroxide and heated for half an hour in an oil bath of 160–170° C. under reduced pressure of 50 mm. Hg. 3.2 g. (93%) of methyl 8-methoxy-6-oxo-7-octenoate is obtained by distillation of the reaction mixture in vacuo, as well as in Example 8.

EXAMPLE 10

Methyl 8-Dimethoxy-6-Oxooctanoate

To the solution of 13 g. of methyl 8-methoxy-6-oxo-7-octenoate in 13 ml. of methanol is dropped the solution of 1 g. of metal sodium in 20 ml. of absolute methanol at 0–5° C. and allowed to stand for a night. The reaction mixture is poured onto ice-water, saturated with salt and extracted with benzene. The benzene layer is washed with water, dried and the benzene is evaporated. The residue is distilled in vacuo yielding 12.9 g. (85.5%) of methyl 8-dimethoxy-6-oxooctanoate at B.P. 121–122° C./0.8 mm. Hg.

*Analysis.*—Calculated for $C_{11}H_{20}O_5$: C, 56.88; H, 8.68. Found: C, 57.17; H, 8.80.

EXAMPLE 11

Methyl 8-Isothiocyano-6-Oxo-7-Octenoate

To the solution of 10.8 g. of potassium thiocyanate in 16 ml. of water is added the solution of 20 g. of methyl 8-chloro-6-oxo-7-octenoate in 80 ml. of ethanol. The mixture is heated for two and a half hours on a water bath and ethanol evaporated. To the reaction mixture is added water and crystals thus produced are gathered by filtration and recrystallized from methanol to produce 16.2 g. of methyl 8-isothiocyano-6-oxo-7-octenoate, M.P. 98–99° C.

*Analysis.*—Calculated for $C_{10}H_{13}O_3NS$: C, 52.86; H, 5.77; N, 6.17. Found: C, 52.41; H, 5.77; N, 5.99.

EXAMPLE 12

Methyl 8,8′-Thiobis (6-Oxo-7-Octenoate)

3.4 g. of sodium sulfide ($9H_2O$) and 0.46 g. of sulfur are dissolved in 25 ml. of ethanol to produce sodium disulfide. To the solution thus obtained is dropped the solution of 4.5 g. of methyl 8-chloro-6-oxo-7-octenoate in 30 ml. of ethanol at room temperature under stirring. After the addition is finished, the reaction is continued for about ten minutes. The reaction mixture is poured onto water and extracted with ether. The ether layer is washed with water and dried. Ether is evaporated to produce crystallized residue. 2.5 g. of methyl 8,8′-thiobis (6-oxo-7-octenoate) of M.P. 88–89° C. is obtained by recrystallization of the product from aqueous ethanol.

*Analysis.*—Calculated for $C_{18}H_{26}O_6S$: C, 58.37; H, 7.08; S, 8.64. Found: C, 58.57; H, 7.19; S, 8.57.

The same product is obtained by using sodium sulfide or sodium thiosulfate in place of sodium disulfide in the above reaction.

EXAMPLE 13

6,8-Dimercaptooctanoic Acid

To the solution of 19.2 g. of sodium sulfide ($9H_2O$) and 5.1 g. of sulfur in 72 ml. of water is added the solution of 19 g. of cobalt chloride ($6H_2O$) in 40 ml. of water at a time under vigorous stirring. Black cobalt polysulfide thus precipitated is gathered by filtration, washed fully with water and with glacial acetic acid and stored in ice room.

16.2 g. of methyl 6-oxo-8-dimethoxyoctanoate, 6.7 g. of sulfur, 35 ml. of glacial acetic acid and a half amount of the catalyst prepared by the method as above are placed in an autoclave and reduced at 140–160° C. under 115 atms. at the first hydrogen pressure. When pressure reduces to 75 atms., hydrogen is introduced to elevate the pressure to the first condition. Absorption of hydrogen comes to end after six hours. After the solution is cooled, the catalyst is filtered off and the solvent is distilled off. The residue is extracted with ether, shaking the extract with 10% caustic soda solution, acidifying the said solution with acetic acid and extracting the solution with ether. The ether solution is washed with water, dried and evaporated. The residue is distilled in vacuo yielding 6,8-dimercaptooctanoic acid which has B.P. 155–160° C./0.3 mm. Hg.

*Analysis.*—Calculated for $C_8H_{16}O_2S_2$: C, 46.12; H, 7.74; S, 30.74. Found: C, 46.52; H, 7.46; S, 30.30.

EXAMPLE 14

Methyl 6,8-Dimercaptooctanoate

A catalyst produced from 6.6 g. of sodium sulfide ($9H_2O$), 1.8 g. of sulfur and 6.5 g. of cobalt chloride ($6H_2O$) as in Example 13 is mixed with 10 g. of methyl 6-oxo-8-dimethoxyoctanoate, 4.3 g. of sulfur and 25 ml. of glacial acetic acid, and the mixture is reduced at 140–160° C. for six hours under 93 atms. at the first hydrogen pressure in an autoclave. When the pressure reduces to 60 atms., hydrogen is introduced to elevate the pressure to about 100 atms. After the reduction is finished, the catalyst is filtered off and acetic acid is distilled off. The residue is heated with reflux for one hour and a half with 40 ml. of absolute methanol and 0.5 ml. of conc. sulfuric acid. Methanol is distilled off in reduced pressure and the residue is poured onto the mixture of ice water and ethyl acetate, and extracted with ethyl acetate. The layer of ethyl acetate is washed with water and dried. The residue obtained by evaporation of the solvent is distilled in vacuo yielding methyl 6,8-dimercaptooctanoate at B.P. 112–120° C./0.2 mm. Hg.

*Analysis.*—Calculated for $C_9H_{18}O_2S_2$: C, 48,64; H, 8.16. Found: C, 48.35; H, 8.46.

EXAMPLE 15

6,8-Dimercaptooctanoic Acid 8.2 g. of methyl 8-diacetoxy-6-oxooctanoate, 2.9 g. of sulfur, 25 ml. of glacial acetic acid and the catalyst, which is prepared from 6.6 g. of sodium sulfide ($9H_2O$), 1.8 g. of sulfur and 6.5 g. of cobalt chloride ($6H_2O$) by the method of Example 13, are placed in an autoclave and reduced at 158–165° C. for six hours under 100 atms. at the first hydrogen pressure. After the reduction is finished, the reaction mixture is treated as well as in Example 13 to produce 6,8-dimercaptooctanoic acid having B.P. 150–160° C./0.5 mm. Hg.

EXAMPLE 16

6,8-Dimercaptooctanoic Acid 8.6 g. of methyl 8-methoxy-6-oxo-7-octenoate, 4.3 g. of sulfur, 25 ml. of glacial acetic acid and the catalyst prepared from 6.5 g. of cobalt chloride ($6H_2O$) by the method of Example 13 are placed into an autoclave and reduced at 152–165° C. for seven hours under 115 atms. at the first hydrogen pressure. After the catalyst is filtered off, the solution is treated by the way as in Example 13 to produce 6,8-dimercaptooctanoic acid having B.P. 150–160° C./0.3 mm. Hg.

EXAMPLE 17

6,8-Dimercaptooctanoic Acid

A catalyst prepared from 6.6 g. of sodium sulfide ($9H_2O$), 1.8 g. of sulfur and 6.5 g. of cobalt chloride ($6H_2O$) as in Example 13 is mixed with 10 g. of methyl 8-chloro-6-oxo-7-octenoate, 4.7 g. of sulfur, 4.4 ml. of anhydrous sodium acetate and 25 ml. of glacial acetic acid, and the mixture is reduced at 150–160° C. for six hours under 115 atms. at the first hydrogen pressure in an autoclave. When the pressure reduces to 75 atms., hydrogen is introduced to elevate the pressure to about 100 atms. After the reduction is finished, the catalyst is filtered off and the solvent is distilled off. Ether solution obtained by extraction of the residue thus produced is shaken with saturated aqueous solution of sodium bicarbonate and the said solution is acidified with acetic acid and extracted with ether. The ether extract is washed with water, dried and evaporated. The residue is distilled in vacuo yielding 6,8-dimercaptooctanoic acid at B.P. 150–157° C./0.2 mm. Hg.

EXAMPLE 18

6,8-Dimercaptooctanoic Acid

A catalyst prepared by the same method as in Example 13 from 4.5 g. of sulfur and 6.5 g. of cobalt chloride ($6H_2O$) is mixed with 20 g. of methyl 8-dibenzylthio-6-oxo-octanoate in 25 ml. of glacial acetic acid. The mixture is reduced at 150–160° C. for seven hours under 95 atms. at the first hydrogen pressure in an autoclave. After the reduction is finished, the catalyst is filtered off and the solvent removed. The residue is distilled in vacuo yielding 6,8-dimercaptooctanoic acid at B.P. 155–160° C./0.3 mm. Hg.

EXAMPLE 19

6,8-Dimercaptooctanoic Acid 10 g. of methyl 8-isothiocyano-6-oxo-7-octenoate, 4.2 g. of sulfur, 25 ml. of glacial acetic acid and the equivalent amount of cobalt polysulfide catalyst prepared by the method of Example 13 are placed in an autoclave and reduced at 152–162° C. for seven hours under 95 atms. at the first hydrogen pressure. After the reduction is finished, the catalyst is filtered off. By the treating as in Example 13, 6,8-dimercaptooctanoic acid of B.P. 140–155° C./0.1 mm. Hg is obtained.

EXAMPLE 20

6,8-Dimercaptooctanoic Acid 4.2 g. of methyl 8,8'-thiobis (6-oxo-7-octenoate), 1.0 g. of sulfur, 25 ml. of glacial acetic acid and cobalt polysulfide catalyst prepared as in Example 13 are placed in an autoclave and reduced at 163–168° C. for eight hours under 90 atms. at the first hydrogen pressure. By the treating as in Example 13, 6,8-dimercaptooctanoic acid of B.P. 150–160° C./0.1 mm. Hg is obtained.

EXAMPLE 21

6,8-Dithiooctanoic Acid 6.6 g. of methyl 6,8-dimercaptooctanoate is dissolved in 30 ml. of dry ether and to this solution is added 4.5 g. of pulverized potassium hydroxide. 8.5 g. of p-toluenesulfonyl chloride in 40 ml. of dry ether is dropped to the mixture keeping at below 0° C. and continued stirring at about 0° C. for five hours. Water is added to the reaction mixture and ether layer is separated, washed with water and evaporated to produce 5.5 g. of crude methyl 6,8-dithiooctanoate. The product is dissolved in 45 ml. of ethanol and 60 ml. of 5% aqueous solution of sodium hydroxide is added. The mixture is heated for eight hours with reflux and ethanol is evaporated. To the residue is added benzene, acidified with hydrochloric acid and extracted. The benzene extract thus obtained is washed with water and dried, and benzene is removed. The residue is distilled in vacuo yielding 6,8-dithiooctanoic acid at B.P. 155–170° C./0.2 mm. Hg which solidifies. The product is recrystallized from cyclohexane to yellow needles of M.P. 61–62° C.

Ultraviolet absorption spectrum $\lambda_{max.}^{C_2H_5OH}$ 332 m$\mu$

Analysis.—Calculated for $C_8H_{14}O_2S_2$: C, 46.55; H, 6.84; S, 31.05. Found: C, 46.31; H, 6.99; S, 29.78.

EXAMPLE 22

6,8-Dithiooctanoic Acid

To 5.8 g. of methyl 6,8-dimercaptooctanoate in 10 ml. of dry pyridine is slowly added 10 g. of p-toluenesulfonyl chloride at below 0° C. under stirring. After keeping at about 0° C. for four hours, the mixture is poured onto 20 ml. of ice water and extracted with chloroform. The chloroform extract is washed with dil. sulfuric acid and with water, and chloroform is evaporated to produce crude methyl 6,8-dithiooctanoate. The product is dissolved in 50 ml. of ethanol and 50 ml. of 5% aqueous solution of sodium hydroxide is added. The mixture is heated with reflux for eight hours and ethanol is evaporated. The residue is extracted with benzene after acidification by hydrochloric acid. The benzene extract is washed with water and dried, and benzene removed. The residue is distilled in vacuo yielding 6,8-dithiooctanoic acid at B.P. 155–175° C./0.2 mm. Hg which solidifies. The product is recrystallized from cyclohexane to 3.2 g. of yellow needles of M.P. 59–60° C.

EXAMPLE 23

6,8-Dithiooctanoic Acid

To the solution of 5.8 g. of methyl 6,8-dimercaptooctanoate in 10 ml. of pyridine is dropped at 0° C. the solution of 6 g. of methanesulfonyl chloride in 10 ml. of pyridine under stirring and kept for two hours at the same temperature. The reaction mixture is poured onto ice-water and extracted with chloroform. The chloroform layer is washed with diluted sulfuric acid and with water and the chloroform evaporated. To the residue is added 50 ml. of ethanol and 50 ml. of the 5% aqueous solution of caustic soda and heated for eight hours under reflux. Ethanol is removed and the residue is extracted with benzene after acidification by hydrochloric acid. The benzene layer is washed with water, dried and the solvent evaporated. The residue is distilled in vacuo yielding 6,8-dimercaptooctanoic acid at B.P. 150–169° C./0.1 mm. Hg which solidifies. The product is recrystallized from cyclohexanone to yellow needles of M.P. 59–62° C.

EXAMPLE 24

Amide of 6,8-Dithiooctanoic Acid

To the solution of 4.2 g. of 6,8-dimercaptooctanoic amide in 10 ml. of pyridine is dropped the solution of 9 g. of p-toluenesulfonyl chloride in 9 ml. of pyridine under stirring and kept for two hours at about 0° C. The reaction mixture is poured onto ice-water and the precipitated product is extracted with chloroform. The chloroform layer is washed with diluted sulfuric acid and with water and chloroform evaporated. The residue is extracted with ethyl acetate. The ethyl acetate layer is washed with water and dried. The residue obtained by evaporation of the solvent is recrystallized from ethanol to produce yellow needles of amide of 6,8-dithiooctanoic acid, M.P. 126–127° C.

Ultraviolet absorprion spectrum $\lambda_{max.}^{C_2H_5OH}$ 332 m$\mu$ ($\epsilon$ 146)

Analysis.—Calculated for $C_8H_{15}ONS_2$: C, 46.80; H, 7.37; N, 6.82. Found: C, 47.25; H, 7.40; N, 6.62.

What we claim is:

1. In a process of producing a dithioalkanoic acid compound of the formula

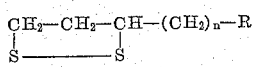

wherein
 n is an integer form 2 to 4, and
 R is a member selected from the group consisting of the carboxyl group, the carbo (lower) alkoxy group, and the carboxamide group,
the steps which comprise adding an organic sulfonyl halide selected from the group consisting of p-toluene sulfonyl chloride, methane sulfonyl chloride, and benzene sulfonyl chloride to a solution of a dimercaptoalkanoic acid compound of the formula

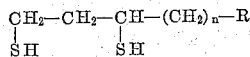

wherein
 R and n represent the same members as indicated above,
in an organic solvent for said dimercaptoalkanoic acid compound with the addition of an alkaline agent selected from the group consisting of an alkali metal hydroxide, alkali metal carbonate, and pyridine and allowing the reaction mixture to stand until disulfide formation is completed.

2. In a process of producing a dithioalkanoic acid compound of the formula

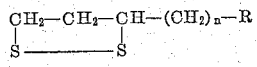

wherein
 n is an integer from 2 to 4, and
 R is a member selected from the group consisting of the carboxyl group, the carbo (lower) alkoxy group, and the carboxamide group,
the steps which comprise adding an organic sulfonyl halide selected from the group consisting of p-toluene sulfonyl chloride, methane sulfonyl chloride, and benzene sulfonyl chloride to a solution of a dimercaptoalkanoic acid compound of the formula

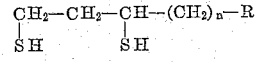

wherein
 R and n represent the same members as indicated above,
in pyridine and allowing the reaction mixture to stand until disulfide formation is completed.

3. In a process of producing 6,8-dithiooctanoic acid, the steps which comprise adding an organic sulfonyl halide selected from the group consisting of p-toluene sulfonyl chloride, methane sulfonyl chloride and benzene sulfonyl chloride to a solution of a lower alkyl ester of 6,8-dimercaptooctanoic acid in an organic solvent for said ester with the addition of an alkaline agent selected from the group consisting of an alkali metal hydroxide, alkali metal carbonate, and pyridine, and allowing the reaction mixture to stand until disulfide formation is completed.

4. In a process of producing 6,8-dithiooctanoic acid, the steps which comprise adding an organic sulfonyl halide selected from the group consisting of p-toluene sulfonyl chloride, methane sulfonyl chloride and benzene sulfonyl chloride to a solution of a lower alkyl ester of 6,8-dimercaptooctanoic acid in pyridine, and allowing the reaction mixture to stand until disulfide formation is completed.

5. In a process of producing 6,8-dithiooctanoic acid amide, the steps which comprise adding an organic sulfonyl halide selected from the group consisting of p-toluene sulfonyl chloride, methane sulfonyl chloride and benzene sulfonyl chloride to a solution of 6,8-dimercaptooctanoic acid amide in an organic solvent for said acid amide with the addition of an alkaline agent selected from the group consisting of an alkali metal hydroxide, alkali metal carbonate, and pyridine and allowing the reaction mixture to stand until disulfide formation is completed.

6. In a process of producing 6,8-dithiooctanoic acid amide, the steps which comprise adding an organic sulfonyl halide selected from the group consisting of p-toluene sulfonyl chloride, methane sulfonyl chloride and benzene sulfonyl chloride to a solution of 6,8-dimercaptooctanoic acid amide in pyridine and allowing the reaction mixture to stand until disulfide formation is completed.

References Cited in the file of this patent

UNITED STATES PATENTS

| | | |
|---|---|---|
| 2,752,373 | Acker | June 26, 1956 |
| 2,752,374 | Acker et al. | June 26, 1956 |
| 2,759,005 | Starker et al. | Aug. 14, 1956 |

OTHER REFERENCES

Hurd et al.: Journal of the American Chemical Society, volume 74, pages 5234–5329 (1952).

Chemical Abstracts, volume 49, column 8796 (1955).